Nov. 21, 1939.  S. KROLL ET AL  2,180,531
CARRIAGE
Filed Aug. 18, 1937    2 Sheets-Sheet 1
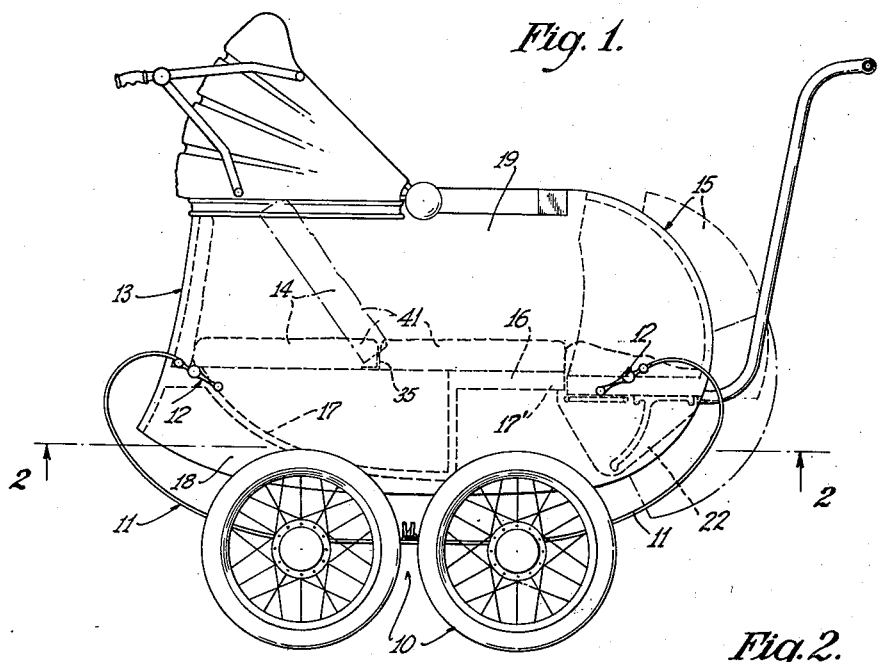
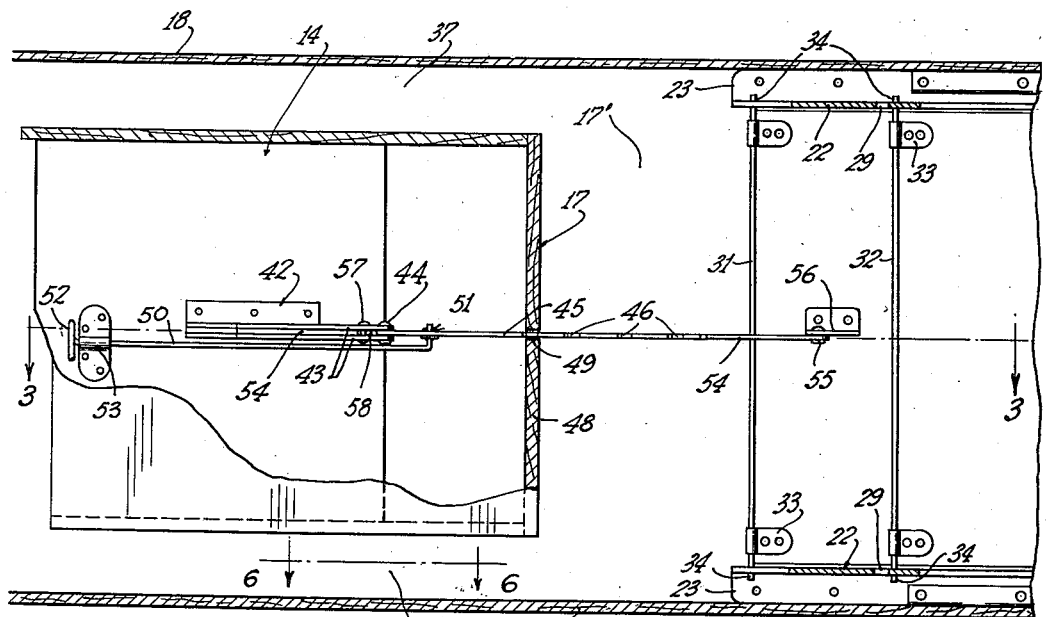
Nathan J. Kroll
and Samuel Kroll
INVENTORS
BY Clarence E. Threedy
THEIR ATTORNEY.

Nov. 21, 1939.   S. KROLL ET AL   2,180,531
CARRIAGE
Filed Aug. 18, 1937   2 Sheets-Sheet 2
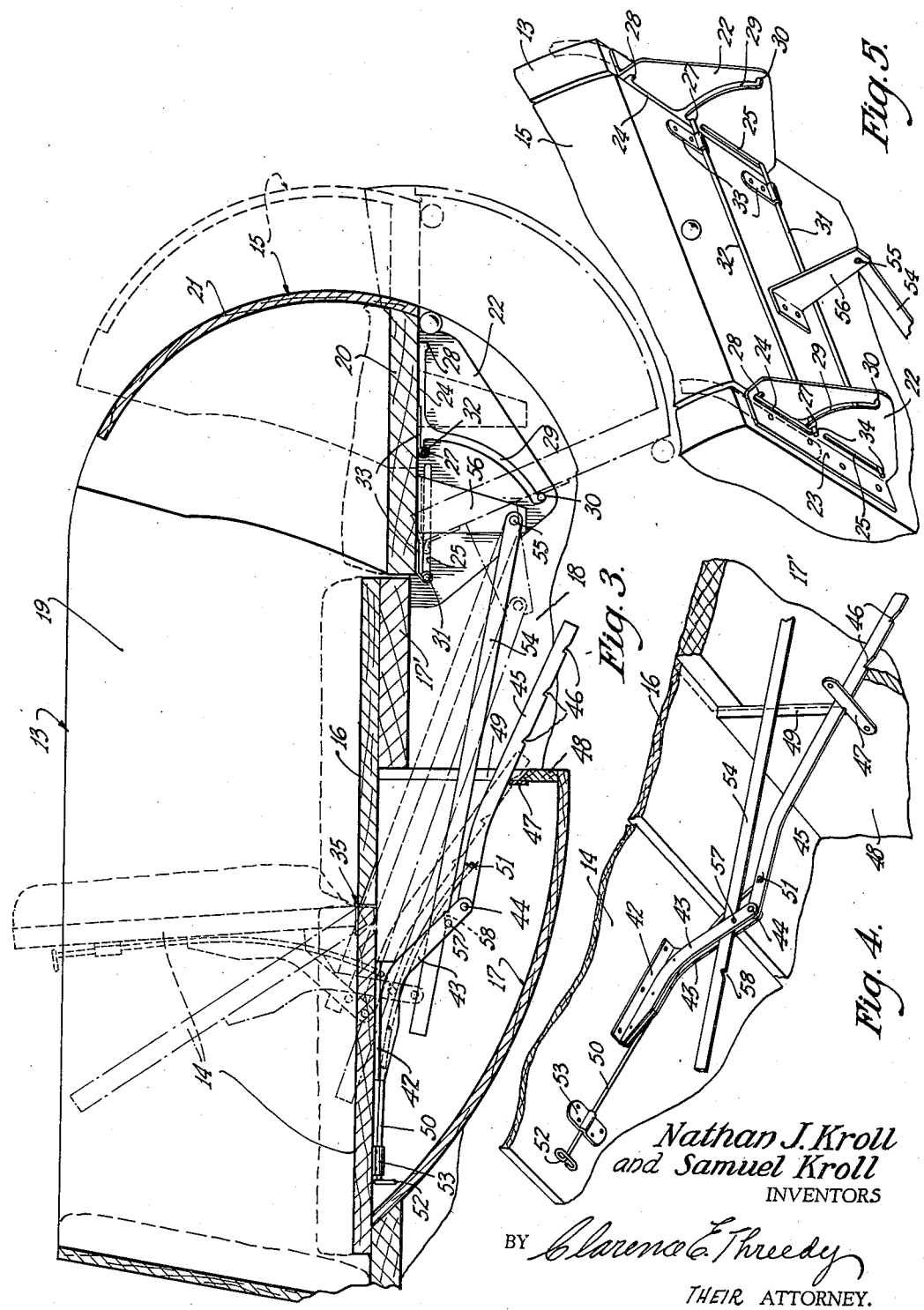
Nathan J. Kroll
and Samuel Kroll
INVENTORS
BY Clarence E. Threedy
THEIR ATTORNEY.

Patented Nov. 21, 1939

2,180,531

UNITED STATES PATENT OFFICE 2,180,531

CARRIAGE

Samuel Kroll and Nathan J. Kroll, Chicago, Ill.

Application August 18, 1937, Serial No. 159,683

19 Claims. (Cl. 280—47)

This invention pertains to carriages, particularly baby carriages, and has among its important objects the provision of improved footwell and back rest structures in the cab of the carriage.

A further object of the invention is the provision in a carriage cab of a footwell which is slidably adjustable in a horizontal plane and also pivotably adjustable about a horizontal axis.

Another object is the provision in a carriage cab of a back rest adapted to be raised automatically by adjustment of the footwell when the latter is pivotally adjusted.

Still another object is the provision in a carriage having an adjustable footwell and an adjustable back rest, of mechanism for automatically positioning the back rest responsive to an adjustment of the footwell, together with mechanism for selectively positioning the back rest independently of any adjustment of the footwell.

Yet another object is the provision of improved adjustable mounting means for a footwell structure and adapted to facilitate the sliding adjustment of the footwell in a horizontal direction and also its pivotal adjustment about a horizontal axis.

Still another object is the provision of novel self-latching linkage mechanism between a carriage footwell and a back rest for automatically adjusting the back rest responsive to adjustment of the footwell.

Other novel aspects of the invention both in construction and operation will appear as the following detailed description proceeds in view of the drawings, in which:

Fig. 1 is a side elevation of a carriage incorporating the present improvements;

Fig. 2 is an enlarged fragmentary bottom plan view of the carriage cab and adjusting mechanism as viewed along lines 2—2 of Fig. 1;

Fig. 3 is an enlarged fragmentary vertical section viewed along lines 3—3 of Fig. 2;

Fig. 4 is a fragmentary bottom perspective of the automatic adjusting mechanism;

Fig. 5 is another fragmentary bottom perspective showing the improved footwell mounting means; while Fig. 6 is an enlarged fragmentary detail in vertical section of the back rest mounting viewed in the direction of lines 6—6 of Fig. 2.

The present invention constitutes an improvement upon the adjustable footwell structure disclosed and claimed in our United States Patent No. 2,058,997, granted October 27, 1936, for improvements in a carriage footwell.

A preferred structure embodying the improvements of the present invention is disclosed in the accompanying drawings and applied to a type of baby carriage seen in Fig. 1 and comprising generally a carriage chassis including a wheel structure 10 mounted upon cantilever springs 11 attached by shackles 12 to the carriage cab 13, the latter including a bottom or floor portion comprised of a movable back rest section 14 and an adjustable footwell 15, each of the latter flanking an intermediate stationary bottom portion 16. The cab has a false bottom divided into a rear section 17 and a front section 17', the latter being shielded from view by depending skirt portions 18 of the side wall panels 19.

As viewed particularly in Fig. 3, the footwell comprises a bottom 20 and an arcuate end wall 21. Means for adjustably mounting the footwell in the cab includes a pair of spaced bracket plates 22 having lateral mounting flanges 23 and attached at opposite sides of the cab to the forward bottom section 17' thereof. Each of these depending bracket plates 22 is provided with a pair of horizontally extensive and contiguous slots 24 and 25, the slots of one plate being in alignment with the corresponding slots in the plate on the opposite side of the cab, the innermost slot 25, that is to say, the one nearest the center of the carriage, has no locking depressions at its ends, while the forward slot 24 in each plate has locking slots or notches 27 and 28 at each of its ends. Each of the plates 22 is further provided with a depending arcuate slot 29 extending downwardly and rearwardly from a point adjacent the innermost or rearward locking notch 27 of the forward slot 24 in each plate. Each of these arcuate slots 29 are provided with a locking notch 30 at their lowermost extremities.

Means for mounting the footwell on the plates 22 includes (referring now to Figs. 2 and 5) a pair of spaced pin or rod members 31 and 32 mounted in parallel, laterally-extensive relation on the bottom 20 of the footwell by means of brackets 33 and constituting an inner or rear hinge or pivot member 31 and a forward or outer supporting pin member or rod 32. Each of these pins or rod members 31 and 32 has axial end portions 34 fitted into corresponding outer and inner horizontal slots 24 and 25, and when the footwell is in its normal raised position as viewed in Fig. 1, the axial end portions 34 of the rear or inner mounting rod 31 are disposed at the ends of the inner or rear horizontal slot 25, while the ends 34 of the forward rod 32 are disposed in the inner locking or seating notches 27 of the forward horizontal slot 24.

In order to adjust the footwell, the latter may be drawn forward in a horizontal plane by applying a slight upward movement to unseat the ends 34 of the forward supporting rod 32 from the locking notches 27 in the forward horizontal slot 24 (Figs. 3 and 5), whereupon both of the crossrod members 31 and 32 may be slid to the ends of the horizontal slots 24 and 25, the axial ends 34 of the forward rod 32 seating in the forward locking notches 28 of the forward horizontal slot 24 and thus securing the footwell against accidental movement in the opposite direction. In this manner the footwell is slidably adjustable in a horizontal plane so as to extend the length of the carriage well.

When it is desired to drop the footwell for the purpose of converting the carriage into a stroller so that the occupant may comfortably sit in an upright position, the footwell is withdrawn in a horizontal direction from its normal position seen in Fig. 3, in the manner just described, with the exception that the well is not drawn to the end of its forward movement but is moved only far enough to position the ends 34 of the forward rod 32 over the open upper end of the arcuate slot 29 in the mounting plate 22, whereupon the footwell will pivot about the rear or inner rod 31 while the ends 34 of the forward rod 32 descend in the slots 29 to the lower end thereof corresponding to a lowered position of the footwell as shown in dotted lines.

The rearward longitudinal end portion of the cab floor is hinged for vertical movement into raised and lowered position to provide a back rest 14, which in its lowered position lies flush with the intermediate stationary floor section 16 and which may be raised to various adjusted positions in a manner hereinafter to be described. The pivotal mounting of the rest 14 is accomplished by means of a substantially concealed hinge 35 (Fig. 6) comprised of a rectangular bracket having a horizontal arm 36 mounted on a stationary portion 37 of the floor, and a vertical arm 38 normally disposed between the confronting edges of the rest and the intermediate floor section 16. A flat complementary bracket 39 is attached on the upper side of the rest adjoining the edge confronting the vertical arm 38 of the hinge, the hinge pintle 40 being arranged at the upper end of the vertical arm 38. In this manner the hinge is substantially concealed and leaves a very small portion 39—40 to be covered by cushions 41.

Mechanism is provided for automatically latching the rest 14 in various raised positions independently of any adjustment of the footwell 15, and this mechanism includes a yoke-like or forked bracket 42 mounted substantially centrally on the under side of the rest 14 (Fig. 4 especially), this bracket having a pair of depending spaced yoke or forked fingers 43 having pivotal attachment at their ends 44 with the inner end of a ratchet bar 45 provided with a plurality of ratchet teeth 46 latchingly engageable with a stationary latch bar 47 mounted on a depending partition 48 between the rear and forward false bottom sections 17 and 17', the partition 48 having a vertical slot 49 through which the free end portion of the ratchet rod 45 extends forwardly, the latch bar 47 being extended laterally across the partition slot 49. Thus the weight of the rod 45 normally urges it down onto the latch bar 47 so that as the rest 14 is pivoted (for example left to right or clockwise in Fig. 4) the ratchet bar 45 will be drawn toward the left and cause one of the ratchet teeth 46 to seat automatically on the edge of the latch bar 47, thus securely holding the rest 14 in any one of a plurality of adjusted positions corresponding to the distribution or arrangement of the several notches or ratchet teeth 46.

In order to lower the rest, there is provided a special latch release mechanism (Fig. 4 especially) including a pull rod 50 having its inner edge portion offset and attached as at 51 to the end portion of the ratchet rod 45 nearest the pivotal mounting attachment 44, the opposite end of the pull rod being formed into a handle 52, and the rod being arranged for sliding movement by means of a U clamp or bracket 53 secured to the under side of the back rest 14 near the upper free edge thereof where it may be readily accessible when the rest is in one of its several raised positions. Thus by grasping the handle 52 and pulling the rod 50 toward the left (Fig. 4), the ratchet bar 45 will be pivoted about the point 44 to withdraw the ratchet teeth 46 from the edge of the latch bar 47, thus permitting free reciprocable movement of the ratchet bar 45 in and out of the slot 49 corresponding to a raising or lowering movement of the rest 14.

Means is also provided for automatically adjusting the position of the back rest 14 responsive to a lowering of the footwell 15, and this means includes a horizontal pivot rod 54 having its outer (right-hand) end portion pivotally attached as at 55 to the lower portion of a depending bracket 56 (Figs. 3 and 5) attached to the under side of the bottom 20 of the footwell between the crossrods 31 and 32. The opposite inner (left-hand) portion of the pivot rod 54 extends between the depending yoke fingers of arms 43 of the bracket 42 and rides along its lower edge on a cross pin 57 (Fig. 4) extending between the arms 43, the pivot rod 54 having a tooth 58 along its lower edge engageable with the cross pin 57 when the rod 54 is retracted (toward the right) by movement of the well 15 into raised position so that when the well is subsequently lowered the rod 54 will move toward the left and pivot the back rest 14 clockwise as a result of the engagement of the notch 58 with the cross pin 57 and since the ratchet rod 45 moves with the back rest 14, the latter will be held in any position corresponding to the engaging position of one of the notches 46, while the footwell through its connection 54—57—58 will be held in a corresponding position.

It will be observed that when the rest 14 has been latched into a particular position responsive to a lowering movement of the footwell, that the well may thereafter be restored to its raised position independently of the rest 14, since a raising movement of the well will simply withdraw the disjoined pivot rod 54 (toward the right), disengaging the notch 58 from the pin 57 and leaving the ratchet arm 45 of the rest in latched engagement with the latch bar 47. Thereafter the rest may be lowered by manipulating the pull rod 50—52 in the manner heretofore described. Attention is again called to the fact that the footwell may be slid horizontally without affecting the rest 14.

One preferred method of carrying the invention into effect has been described herein in detail for purposes of illustration and since various changes in form and location of the several parts thus particularly described may be made without departing from the spirit of the invention, it is to be understood that all such changes, rearrangements and modifications are to be fairly included within the call of the appended claims.

Having thus described our invention, what we claim as new and desire to protect by Letters Patent is:

1. In a device of the class described, a back rest mounted for pivotal movement about a horizontal axis, a footwell and means mounting the same for pivotal movement about a horizontal axis and also for horizontally sliding movement, means for automatically latching said back rest in a desired position, and mechanism arranged for operation by movement of said footwell in a particular direction for effecting driving connection with said back rest and effective by continued movement of said footwell in said particular direction to raise said back rest, said back rest being movable into adjusted position independently of the aforesaid mechanism.

2. A carriage having a footwell and means mounting the same for horizontal sliding movement and also for vertical pivotal movement, said means including a pair of spaced depending mounting plates attached to the under side of the carriage, each of said plates having contiguous horizontally extensive slots and one of the slots in each plate having a depending arcuate slot communicating therewith adjacent the contiguous ends of said slots, each of the corresponding slots in one said plate being in alignment with those of the other, said footwell having spaced means on opposite sides of the bottom thereof normally disposed in each of said contiguous slots and adapted for horizontal movement therein, said means in one of said slots being movable into said arcuate slots communicating therewith to effect pivotal movement of said footwell about the other said spaced means for raising and lowering the footwell.

3. The footwell mounting means set forth in claim 2 and further characterized by the provision of locking notches at the opposite extremities of the said slot having communication with said arcuate depending slot, and said last-mentioned slot having a locking notch at its lowermost extremity.

4. A carriage having a vertically pivotable back rest and means for maintaining the same in adjusted positions, said means including a stationary latch member mounted on said carriage, and an elongated ratchet bar and bracket means pivotally attaching the same near one of its ends to said back rest with portions of the bar toward its opposite end resting slidably on said latch member and provided with spaced means latchingly engageable with said latch member responsive to sliding movement of said ratchet bar by a pivotal movement of said back rest, and manually operable pull rod means operatively connected to said ratchet bar and operable to pivot the latter out of latching engagement with said latch member so that the back rest may be freely moved, said carriage having a footwell movable into raised and lowered position, and means including an elongated pivot rod having pivotal attachment near one end to said footwell and having sliding pin and slot engagement in the region toward its opposite end with said bracket means for pivoting said back rest in raising movement responsive to a lowering movement of said footwell.

5. A carriage having a footwell mounted for movement into raised and lowered position and a back rest pivotally mounted for movement into raised and lowered positions, back rest latching mechanism including a ratchet bar and bracket means pivotally attaching the same to said back rest said ratchet bar having sliding latching engagement with stationary latch bar means on said carriage for automatically latching said rest in desired raised positions, and means including a pivot rod pivotally attached to said footwell and having sliding pin and slot engagement with said bracket means of the latching mechanism, said bracket means being arranged and constructed so that said pivot rod may be automatically and operatively associated with said back rest mechanism for effecting pivotal movement of the rest when said footwell is lowered, said pivot rod being automatically disengaged from operative association with said rest mechanism when said footwell is raised, and manually operable means for disengaging said ratchet bar from said stationary latch bar to effect a lowering movement of said back rest.

6. The device of claim 5 further characterized by the provision of means for mounting said footwell for both horizontal sliding and vertical pivotal movement, said footwell being slidable horizontally independently of said back rest mechanism by virtue of the construction and arrangement of said sliding pin and slot engagement of the pivot rod with said back rest mechanism as aforesaid.

7. In a carriage of the type having a footwell mounted for horizontal and vertical adjustment and a back rest mounted for vertical adjustment, means providing an operative connection for simultaneous adjustment of the footwell and back rest, said means comprising: latching mechanism attached to the back side of said back rest and arranged for automatic cooperation with stationary latch means to secure said back rest in vertically adjusted positions, and a back rest moving member operatively connected with said footwell and arranged and constructed to be moved by said footwell in adjusting operation of the same to effect operative association with said latching mechanism whereby said back rest will be adjustably moved responsive to an adjusting movement of said footwell.

8. A carriage having a pivotally mounted back rest and automatic latching means for maintaining said rest in a desired raised position, and a footwell normally mounted in raised position and movable into lowered position, and means arranged for movement by said footwell into position to effect automatic operative association of said footwell and said latching mechanism for cooperation to effect a raising of said back rest responsive to a lowering movement of said footwell, said footwell being movable back into raised position independently of said back rest and the latter being provided with manually operable latch releasing means.

9. A carriage having a back rest movable about a horizontal axis into raised and lowered position, and automatic latch means therefor and including a ratchet rod pivotally attached at one end thereto and adapted to rest by gravity on a horizontal latch member attached to said carriage, said ratchet rod having tooth formations engageable with said latch member when said ratchet rod is moved responsive to a raising of said rest and effective to hold the latter in a desired position, together with manually operable latch release means for lifting said ratchet rod for latching engagement with said latch member to restore said rest to lowered position, said carriage having a footwell mounted for raising and lowering movement about a horizontal axis, and pivot rod means attached to said footwell and having sliding bearing engagement with said latching mechanism of the back rest and having slot means automatically engageable with pin means arranged in said latching mechanism when said footwell is in raised position and effective to raise said rest when said footwell is lowered.

10. In a device of the class described, a back rest arranged for raising and lowering movement, a footwell arranged for sliding movement in a substantially horizontal plane, said footwell also being slidable into a predetermined position for pivotal movement into lowered position, and back rest operating mechanism actuated by said footwell and including means moved by the latter to effect operative engagement with said back rest when said footwell is lowered from said predetermined position whereby subsequent lowering movement of the footwell will effect a raising of said back rest.

11. In a carriage, a pivoted back rest arranged for raising and lowering movement, a footwell and means mounting the same for sliding movement into various positions longitudinally of the carriage, said means being arranged and constructed to permit pivotal lowering movement of said footwell from raised position when the same is slid into a predetermined position, manually releasable latch mechanism for automatically latching said back rest in various positions, and means including a member having operative connection with said footwell and arranged to be actuated by movement of the latter to effect operative connection with said releasable latch mechanism and effective when said footwell is lowered from said predetermined position to effect raising movement of said back rest, said latch mechanism being arangerd to permit movement of said back rest into various positions independently of the position of said footwell.

12. In a carriage, a back rest arranged for pivotal movement about a substantially horizontal axis, a stationary latch member on said carriage, a bracket attached to one side of said back rest, a latch rod pivotally mounted near one end on said bracket for movement in a vertical plane, said latch rod having latch means cooperable with said stationary latch member and bearing by its own weight against said stationary latch member during normal pivotal movement of said back rest, a footwell and means mounting the same for horizontal sliding movement and providing for pivotal up and down movement of the footwell when the same is slid a predetermined distance away from a particular position, and back-rest-operating means including an elongated member having pivotal connection near one end with said footwell and being arranged for sliding movement relative to said bracket means responsive to movement of said footwell, and means on said elongated member and bracket means for effecting operative connection between the former and the latter for raising the back rest when the footwell is lowered as aforesaid.

13. In a device of the class described, a pivoted back rest, a footwell and means mounting the same for horizontal sliding movement, said means also being arranged and constructed to permit raising and lowering of said footwell when the latter is slid into a predetermined position, a bifurcated bracket depending from the under side of said back rest, an elongated latch rod pivotally attached near one end to said bracket for vertical pivotal movement, said latch rod having latch means arranged along one edge, a stationary latch member on said carriage and providing a sliding rest for said latch rod and cooperable with the latch means of the latter to automatically latch said back rest in various raised positions, manual means for raising said latch rod out of latching engagement with said stationary latch member, a pivot rod having pivotal connection near one end with said footwell for pivotal movement in a vertical plane, the opposite end region of said pivot rod projecting movably between the bifurcations of said bracket, means on said pivot rod cooperable with means on said bracket for effecting driving connection between said pivot rod and bracket whereby to effect raising movement of said back rest responsive to lowering movement of the footwell.

14. In a device of the class described, a footwell and means mounting the same for horizontal sliding movement between opposite limits, said means being further arranged and constructed to permit raising and lowering movement of the footwell when the same is slid into a predetermined position between said limits, a back rest arranged for raising and lowering movement, and mechanism actuated by said footwell and arranged to effect impositive driving connection with said back rest when said footwell is lowered predetermined amounts whereby to raise said back rest, and manually releasable mechanism for automatically latching said back rest in variously raised positions.

15. In a carriage of the type having a vertically movable back rest and a footwell which is movable both horizontally and vertically, operating mechanism for interconnecting the back rest with the footwell for adjusting movement of the latter by the former, said mechanism comprising a member operatively connected with the footwell and movable by movement of the footwell a predetermined amount in a particular direction to effect operative association of said member with said back rest to move the latter in a direction opposite to the direction of movement of the footwell in effecting said association, means for automatically latching said back rest in various positions when the same is moved by the footwell as aforesaid, said operating mechanism being arranged and constructed to permit movement of said footwell oppositely to said particular direction without moving said back rest from a position of adjustment.

16. In a carriage of the type having a vertically movable back rest and a footwell which is movable both horizontally and vertically, operating mechanism for interconnecting the back rest with the footwell for adjusting movement of the latter by the former, said mechanism comprising a member operatively connected with the footwell and movable by movement of the footwell a predetermined amount in a particular direction to effect operative association of said member with said back rest to move the latter in a direction opposite to the direction of movement of the footwell in effecting said association, means for automatically latching said back rest in various positions when the same is moved by the footwell as aforesaid, said operating mechanism being arranged and constructed so that the operative association effected by movement of the footwell as aforesaid will permit movement of the back rest or footwell independently in directions opposite to their respective coacting directions of movement.

17. In a carriage of the type having a back rest and a footwell both mounted for pivotal movement about parallel horizontal axes, said footwell further being mounted for horizontal movement toward and away from the back rest, operating mechanism interconnecting the back rest and footwell for pivotal movement together, said mechanism including a bracket attached to the rear side of the back rest, a latch rod pivotally attached to said bracket and urged by gravity into transient latching engagement with stationary latch means, whereby the back rest may be automatically latched in various raised positions, and a pivot member having pivotal connection with the under side of said footwell and slidably associated with said bracket to effect driving connection with the latter when the footwell is pivotally lowered a predetermined amount whereby continued lowering movement of the footwell will effect raising movement of the back rest, said pivot member being arranged and constructed to be retracted out of driving connection with said bracket when the footwell is raised without moving said back rest, said pivot member and said bracket being arranged and constructed to permit movement of the back rest independently of the footwell, and latch releasing means coacting with said latch rod to permit free movement of the back rest.

18. In a carriage, an adjustable footwell structure including opposite brackets arranged on the carriage and each having a pair of contiguous slots arranged with the slots of one bracket aligned with the corresponding slots of the other, mounting means on said footwell severally disposed for sliding movement in said slots and supporting said footwell for horizontally shifting movement, one of the slots in each of said brackets being open in a direction downwardly away therefrom from a point near the contiguous ends of the slots and into which opening certain of said mounting means may move to permit vertical pivotal movement of the footwell.

19. In a carriage, an adjustable footwell mounted for horizontally sliding movement and also for pivotal movement about a horizontal axis, and means for supporting said footwell in adjusted positions and including bracket means attached to said carriage, said bracket means being provided with slot formations including a horizontally extensive slot portion and another communicating slot portion extending downwardly from a point between the ends of said first-mentioned horizontal slot portion, and means attached to said footwell and arranged for movement in a horizontally extensive slot portion of the bracket means to maintain said footwell in raised position for horizontally sliding movement and further arranged to be disposed in a certain position for movement into said downwardly extending slot portion by horizontal movement of the footwell into a certain position so as to permit pivotal lowering movement of the footwell.

NATHAN J. KROLL.
SAMUEL KROLL.